(12) United States Patent
Homma et al.

(10) Patent No.: US 8,884,043 B2
(45) Date of Patent: Nov. 11, 2014

(54) OIL OR FAT COMPOSITION

(75) Inventors: Rika Homma, Sumida-ku (JP); Masao Shimizu, Sumida-ku (JP); Junya Moriwaki, Sumida-ku (JP); Minoru Kase, Kamisu (JP); Tetsuya Abe, Kamisu (JP); Shinpei Fukuhara, Kamisu (JP); Toshiteru Komatsu, Kamisu (JP); Keiji Shibata, Kamisu (JP)

(73) Assignee: Kao Corporation, Tokyo (JP)

( * ) Notice: Subject to any disclaimer, the term of this patent is extended or adjusted under 35 U.S.C. 154(b) by 215 days.

(21) Appl. No.: 13/516,560

(22) PCT Filed: Dec. 14, 2010

(86) PCT No.: PCT/JP2010/072478
§ 371 (c)(1),
(2), (4) Date: Jun. 15, 2012

(87) PCT Pub. No.: WO2011/074575
PCT Pub. Date: Jun. 23, 2011

(65) Prior Publication Data
US 2012/0259133 A1 Oct. 11, 2012

(30) Foreign Application Priority Data

Dec. 15, 2009 (JP) ................................ 2009-283660
Mar. 31, 2010 (JP) ................................ 2010-083264

(51) Int. Cl.
*A23D 9/00* (2006.01)
*A23D 7/00* (2006.01)
*A23D 9/007* (2006.01)
*A23D 9/02* (2006.01)
*C11B 3/14* (2006.01)

(52) U.S. Cl.
CPC ............... *A23D 7/001* (2013.01); *A23D 9/007* (2013.01); *A23D 7/003* (2013.01); *A23D 9/02* (2013.01); *C11B 3/14* (2013.01)
USPC ............... 554/227; 554/1; 554/223; 554/224; 554/115; 426/601; 426/605; 426/611

(58) Field of Classification Search
CPC ........ A23D 9/007; A23D 7/005; C07C 69/76; C11C 5/02; C11B 3/001; C11B 3/10; C11B 3/12
See application file for complete search history.

(56) References Cited

U.S. PATENT DOCUMENTS

| | | | |
|---|---|---|---|
| 4,599,143 A | 7/1986 | Stage | |
| 4,601,790 A | 7/1986 | Stage | |
| 2006/0161012 A1 | 7/2006 | Maruyama et al. | |
| 2006/0258872 A1 | 11/2006 | Kase et al. | |
| 2008/0069932 A1 | 3/2008 | Kohori et al. | |
| 2008/0071101 A1 | 3/2008 | Maruyama et al. | |
| 2010/0267681 A1 | 10/2010 | Hosoya et al. | |
| 2011/0076358 A1 | 3/2011 | Kase et al. | |
| 2012/0258232 A1* | 10/2012 | Kase et al. | 426/601 |

FOREIGN PATENT DOCUMENTS

| | | |
|---|---|---|
| CN | 1800326 A | 7/2006 |
| CN | 1854277 A | 11/2006 |
| CN | 1949983 A | 4/2007 |
| CN | 101505609 A | 8/2009 |
| JP | 59 68398 | 4/1984 |
| JP | 4 261497 | 9/1992 |
| JP | 2971962 B2 | 8/1999 |
| JP | 2006 63252 | 3/2006 |
| JP | 2006 174808 | 7/2006 |
| JP | 2007 14263 | 1/2007 |
| JP | 2009 40854 | 2/2009 |
| JP | 2011 213835 | 10/2011 |
| RU | 2352549 | 5/2005 |
| RU | 2285535 | 10/2006 |
| WO | WO 2009/144858 A1 | 12/2009 |

OTHER PUBLICATIONS van Duijn, G. Potential ways of reduction of 3-MCPD esters in vegetable oils, Feb. 2009, FEDIOL, 15 pages.*
Joffre, E. et al., 3-MCPD esters in edible oils: analytical aspects, Oct. 2009, EuroFed Lipid, Graz, 25 pages.*
U.S. Appl. No. 13/996,904, filed Jun. 21, 2013, Homma, et al.
Zelinkova, Z., et al., "Fatty acid esters of 3-chloropropane-1,2-diol in edible oils," Food Additives and Contaminants, vol. 23, No. 12, pp. 1290-1298, (2006).
Bauer, N., et al., "Glycidol-Fettsaeureester in Saeuglingsmilchnahrung nachgewiesen," DLR, vol. 105, No. 6, pp. 361-362, (Jun. 2009).
International Search Report Issued Mar. 1, 2011 in PCT/JP10/72478 Filed Dec. 14, 2010.
K. Franke, et al, "Influence of chemical refining process and oil type on bound 3-chloro-1, 2-propanediol contents in palm oil and rapeseed oil", LWT—Food Science and Technology, 42, 2009, pp. 1751-1754.
U.S. Appl. No. 13/988,170, filed May 17, 2013, Homma, et al.
Office Action issued Jan. 15, 2013 in Chinese Patent Application No. 201080056576.X.
U.S. Appl. No. 14/240,214, filed Feb. 21, 2014, Homma, et al.

(Continued)

*Primary Examiner* — Yate K Cutliff

(74) *Attorney, Agent, or Firm* — Oblon, Spivak, McClelland, Maier & Neustadt, L.L.P.

(57) ABSTRACT

Provided is an oil or fat composition, which has an MCPD-FS content (ppm) of 13 ppm or less, the content being measured by a Deutsche Gesellschaft für Fettwissenschaft (DGF) standard method C-III 18(09), has a diacylglycerol content of 15 mass % or more, and is subjected to deodorization treatment.

21 Claims, No Drawings

(56) References Cited

OTHER PUBLICATIONS

U.S. Appl. No. 14/347,888, filed Mar. 27, 2014, Homma, et al.
U.S. Appl. No. 14/347,915, filed Mar. 27, 2014, Homma, et al.
U.S. Appl. No. 14/240,295, filed Feb. 21, 2014, Homma, et al.
U.S. Appl. No. 14/240,206, filed Feb. 21, 2014, Homma, et al.
U.S. Appl. No. 14/240,248, filed Feb. 21, 2014, Homma, et al.
U.S. Appl. No. 14/240,209, filed Feb. 21, 2014, Homma, et al.
"Federal Institute for Risk Assessment, Collaborative Study for the Determination of 3-MCPD-Fatty Acid Esters in Edible Fats and Oils, Second Collaborative Study—Part 1, Method Validation and Proficiency Test"; BfR, pp. 5, 7 (Berlin 2011, BfR-Wissenschaft Apr. 2012).

The Nisshin Oillio group, Ltd, Hirai, Abe, Shirasawa, "Verification of the DGF Method Recovery test results of 3-MDPD ester and glydidol ester", May 18, 2010.
Shimizu et al "A comparison of the indirect and direct quantification of glycidol ester by kinetic analysis", Eu. J. Lipid Sci. Technol., v. 113, #8, pp. 985-999, (Aug. 2011) (Abstract only).
Shimizu et al, "Elimination of Glycidyl Palmitate in Diolein by Treatment with Activated Bleaching Earth", Journal of Oleo Science, (2012), v. 61, # 1, pp. 23-28.
"Limitation of Indirect quantification for Glycidol Fatty Acid Ester in Edible Oils", Kao Corporation Global RD healthcare Food Labs, AOCS meeting in Phoenix, AZ, May 18, 2010.
U.S. Appl. No. 14/350,955, filed Apr. 10, 2014, Homma.

\* cited by examiner

OIL OR FAT COMPOSITION

FIELD OF THE INVENTION

The present invention relates to an oil or fat composition having an improved taste and flavor.

BACKGROUND OF THE INVENTION

An oil or fat is essential as a nutrient and energy source for a body (primary function), and moreover, is important for providing the so-called sensory function (secondary function), which satisfies preference such as a taste and an aroma. In addition, an oil or fat containing diacylglycerols at a high concentration is known to have a physiological action (tertiary function) such as a body fat-burning action.

Untreated oil or fat obtained by squeezing seeds, germs, pulp or the like of plant contains, for example, fatty acids, monoacylglycerols, odor components or the like. Further, when oil or fat are subjected to a heating process by using a transesterification reaction, an esterification reaction, hydrogenation treatment or the like, trace components are produced in the oil or fat, and thus the taste and flavor of the oil or fat is impaired. In order to use such oil or fat as edible oil, the taste and flavor thereof needs to be improved by removing these trace components. The so-called deodorization treatment in which an oil or fat is brought into contact with water vapor at high temperature under reduced pressure is generally carried out as means for removing the trace components (Patent Document 1).

Further, in order to produce a diacylglycerol-rich oil or fat having a good taste and flavor, an organic acid is added to an oil or fat containing diacylglycerols at a high concentration, and decoloration treatment is carried out with a porous adsorbent, followed by deodorization treatment (Patent Document 2).

PRIOR ART DOCUMENT

Patent Document

[Patent Document 1] JP-A-59-68398
[Patent Document 2] JP-A-4-261497

SUMMARY OF THE INVENTION

The present invention relates to an oil or fat composition, which has a content of 3-chloropropane-1,2-diol forming substances (MCPD-FS) (ppm) of 13 ppm or less, the content being measured by a DGF standard method C-III 18(09), has a diacylglycerol content of 15 mass % or more, and is subjected to deodorization treatment.

DETAILED DESCRIPTION OF THE INVENTION

When the deodorization treatment is carried out at low temperature, the distillation effect to odor components is low, resulting in a poor taste and flavor. Hence, the deodorization treatment needs to be carried out usually at high temperature. Then, when the deodorization treatment is applied to a diacylglycerol (hereinafter, sometimes referred to as "DAG")-rich oil or fat, it results in a diacylglycerol-rich oil or fat having an initial taste free of a bad oily smell.

On the other hand, when an oil or fat containing DAG at a high concentration is subjected to deodorization treatment at high temperature, a disproportionation reaction occurs owing to transesterification or the like, producing triacylglycerols, and consequently, the concentration of DAG may reduce owing to the formation of triacylglycerol. In addition, the deodorization treatment at high temperature may cause the increase of trans unsaturated fatty acid. Further, it was sometimes pointed out that an oil or fat produced through the deodorization treatment at high temperature had a slightly heavy taste and flavor, in particular, aftertaste. These tendencies are remarkable in an oil or fat composition in which a DAG content is high in a glyceride composition of an oil or fat and the content of linoleic acid is high in constituent fatty acids of an oil or fat. Note that, in this description, the phrase "initial taste" refers to a "taste and flavor sensed in the mouth at an initial stage," the phrase "heaviness of a taste and flavor" of an oil or fat refers to a "viscous and sticking sense in the mouth," and the term "aftertaste" refers to a "taste and flavor remaining in the mouth."

As described above, even if an oil or fat containing DAG was subjected to deodorization treatment under varied conditions, its taste and flavor was not always improved, and hence an oil or fat composition having a more excellent taste and flavor has been demanded.

In view of the foregoing, the inventors according to the present invent ion have made studies on a refinement step for improving a taste and flavor. As a result, the inventors have found that the "heaviness of a taste and flavor in an aftertaste" has a correlation with the content (ppm) of MCPD-FS in an oil or fat, the content being measured by a Deutsche Gesellschaft für Fettwissenschaft (hereinafter, referred to as "DGF") standard method C-III 18(09), and have found that, when the content of the MCPD-FS is 13 ppm or less, an excellent taste and flavor is exerted.

According to the present invention, it is possible to provide an oil or fat composition, which has a high diacylglycerol content and is excellent in taste and flavor.

The content of diacylglycerols in the oil or fat composition according to the present invention is preferably 15 mass % (hereinafter, simply referred to as "%") or more, more preferably 20% or more, 25% or more, more preferably 30% or more, 50% or more, even more preferably 70% or more, from the viewpoint that the oil or fat composition has no bad oily smell of an initial taste, has a light and clean aftertaste, and hence has a good taste and flavor. The upper limit of the content of diacylglycerols is not particularly defined, and is preferably 99% or less, more preferably 98% or less, even more preferably 97% or less, from the viewpoint of industrial productivity. Note that in the present invention, the phrase "oil or fat" refers to an oil or fat containing one or more of glycerols among triacylglycerols, diacylglycerols, and monoacylglycerols.

The oil or fat composition according to the present invention may be produced by using any of a vegetable oil or fat and an animal oil or fat as a raw material. Specific examples of the material include vegetable oils or fats such as soybean oil, rapeseed oil, safflower oil, rice bran oil, corn oil, palm oil, sunflower oil, cotton seed oil, olive oil, sesame oil, and perilla oil, animal oils or fats such as fish oils, lard, beef tallow, and butter fat, and oil or fat such as transesterified oils, hydrogenated oils, and fractionated oils thereof.

The constituent fatty acid of an oil or fat in the oil or fat composition according to the present invention is not particularly limited, and any of saturated fatty acids and unsaturated fatty acids may be used. The number of carbons in the unsaturated fatty acids is preferably 14 to 24, more preferably 16 to 22 from the viewpoint of physiological effects. The saturated fatty acids have preferably 14 to 24 carbon atoms, more preferably 16 to 22 carbon atoms. Of those, palmitic acid and stearic acid are preferred.

Naturally-occurring unsaturated fatty acids having double bonds, which generally have cis conformations, may undergo isomerization to a trans form owing to a thermal history. In the constituent fatty acid of an oil or fat in the oil or fat composition according to the present invention, the content of trans oleic acid, that is, elaidic acid, is preferably 1% or less, more preferably 0.5% or less, even more preferably 0.3% or less, from the viewpoint of physiological effects.

Further, when a ratio of fatty acids having two double bonds including a trans double bond and having 18 carbon atoms (referred to as "trans linoleic acids") to fatty acids having two double bonds and having 18 carbon atoms (referred to as "all linoleic acids") is expressed in terms of percentage, the ratio (referred to as "content (%) of trans isomers") usually tends to increase in proportion to the degree of refining treatment. The content of trans isomers is preferably 4% or less, more preferably 3% or less, even more preferably 2.5% or less.

The oil or fat composition according to the present invention additionally contains triacylglycerols of preferably 4.9 to 84.9%, more preferably 6.9 to 39.9%, even more preferably 6.9 to 29.9%, from the viewpoint of its physiological effects, the industrial productivity of an oil or fat, and its outer appearance. Further, the constituent fatty acids of triacylglycerols are preferably the same constituent fatty acids as those of diacylglycerols, from the viewpoints of the physiological effects and the industrial productivity of an oil or fat.

The oil or fat composition according to the present invention contains monoacylglycerols of preferably 0 to 5%, more preferably 0 to 2.5%, even more preferably 0.1 to 2%, from the viewpoints of its taste and flavor, its outer appearance, the industrial productivity of an oil or fat or the like. The constituent fatty acids of monoacylglycerols are preferably the same constituent fatty acids as those of diacylglycerols, from the viewpoint of the industrial productivity of an oil or fat.

Further, the content of free fatty acids (salts) contained in the oil or fat composition according to the present invention is preferably 5% or less, more preferably 0 to 2%, even more preferably 0 to 1%, from the viewpoints of its taste and flavor and the industrial productivity of an oil or fat.

Further, the oil or fat composition according to the present invention has an MCPD-FS content of 13 ppm or less, the content being measured by the Deutsche Gesellschaft für Fettwissenschaft (DGF) standard method C-III 18(09) (DGF Standard Methods 2009 (14. Supplement), C-III 18(09), "Ester-bound 3-chloropropane-1,2-diol (3-MCPD esters) and glycidol (glycidyl esters)"). The content is preferably 7 ppm or less, more preferably 6 ppm or less, more preferably 5 ppm or less, more preferably 4 ppm or less, more preferably 3 ppm or less, even more preferably 1 ppm or less, from the viewpoint of improving the heaviness of its taste and flavor.

The DGF standard method C-III 18(09) is a microanalytical method for an oil or fat using a gas chromatograph-mass spectrometer (GC-MS) and is a measurement method for 3-chloropropane-1,2-diol and esters thereof (MCPD esters), and glycidol and esters thereof.

The total content of these four components is measured as an analytical value of MCPD-FS.

The present invention uses the method of Option A described in the standard method 7.1 ("7.1 Option A: Determination of the sum of ester-bound 3-MCPD and glycidol"). The details of its measurement method are described in Example.

The oil or fat composition according to the present invention can be obtained by carrying out, for example, an esterification reaction between a fatty acid produced by hydrolysis of an oil or fat and glycerin, or a glycerolysis reaction between an oil or fat and glycerin, and then subjecting the resulting product to refining treatment. The reaction is preferably carried out by using an enzyme such as lipase as a catalyst under a mild condition, because the resulting oil or fat composition is excellent in taste and flavor or the like.

The oil or fat composition according to the present invention can be obtained by appropriately carrying out refining treatment on the basis of MCPD-FS as an index, and can be suitably obtained by performing deodorization treatment. The deodorization treatment is treatment including applying steam distillation under reduced pressure to an oil or fat. The treatment may be performed at a treatment temperature of preferably 120 to 270° C., more preferably 150 to 260° C., even more preferably 180 to 250° C. Further, the treatment may be performed for a treatment time of preferably 1 to 300 minutes, more preferably 3 to 180 minutes, even more preferably 5 to 110 minutes.

In the present invention, it is preferred to apply deodorization treatment to an oil or fat particularly in the final step of refining treatment, from the viewpoint of improving its taste and flavor. It is preferred to set the condition for the deodorization treatment so that the deodorization treatment has a thermal history of lower (milder) temperatures than that of usual deodorization treatment.

Usual deodorization treatment is performed at 190 to 220° C. for 120 to 300 minutes, 220 to 250° C. for 30 to 180 minutes, or 250 to 270° C. for 5 to 60 minutes or the like. On the other hand, the deodorization treatment having a thermal history of lower temperatures is carried out at preferably 120 to 230° C., more preferably 175 to 230° C., for preferably 1 to 110 minutes, more preferably 5 to 110 minutes.

In particular, from the viewpoint of improving the taste and flavor of an oil or fat, (A) when its treatment temperature is 120° C. or more and 205° C. or less, preferably 175° C. or more and 205° C. or less, its treatment time is preferably 5 to 110 minutes, more preferably 10 to 90 minutes, even more preferably 15 to 70 minutes, (B) when its treatment temperature is more than 205° C. and 215° C. or less, its treatment time is preferably 5 to 50 minutes, more preferably 8 to 45 minutes, even more preferably 12 to 40 minutes, and (C) when its treatment temperature is more than 215° C. and 230° C. or less, its treatment time is preferably 5 to 30 minutes, more preferably 7 to 27 minutes, even more preferably 10 to 24 minutes.

The taste and flavor and the color of an oil or fat can be improved by selecting any of these conditions. Note that the time of contact between the oil or fat and the water vapor in each condition means the sum of times during which the oil or fat is treated in the temperature range defined in the each condition, and as long as its treatment temperature is within the temperature range, the treatment temperature may vary. Thus, as long as the treatment temperature at the time of temperature rise and temperature fall is included in the temperature range, the temperature rise time and the temperature fall time are included in the time of contact. Further, when the treatment temperature is intermittently included in the temperature range as a result of a temperature change, the sum of times during which the treatment temperature is included in the temperature range is defined as the time of contact.

A plurality of treatment conditions may be combined by selecting them from the treatment conditions in the condition (A) to the condition (C) described above. It is preferred to use one of the conditions (A) to (C) from the viewpoint of improving the taste and flavor and the color. From the same viewpoint as described above, the condition (A) or the condition (B) is preferred, and the condition (A) is more preferred.

Further, it is preferred to select a pressure of 0.01 to 4 kPa, more preferably 0.03 to 1 kPa, from the viewpoint of improving the taste and flavor of an oil or fat. From the same viewpoint as described above, the amount of water vapor is preferably 0.1 to 20%, more preferably 0.5 to 10%, with respect to the amount of an oil or fat.

In the deodorization treatment, it may be possible to introduce water in place of water vapor and bring the water vapor produced from the water into contact with an oil or fat in a deodorization apparatus. Alternatively, treatment in which an inert gas is brought into contact in place of water vapor may be carried out. The inert gas includes nitrogen, helium and argon or the like. Of those, nitrogen is preferred. It is preferred to adopt, as a treatment condition under which the inert gas is brought into contact, any of the same conditions as those for water vapor.

A method of performing deodorization treatment of an oil or fat is not particularly limited, and it may be possible to adopt a batch method, a semi-continuous method, a continuous method or the like. When the amount of an oil or fat to be treated is small, the batch method is preferably used, and when the amount is large, the semi-continuous method or the continuous method is preferably used.

As an apparatus for the semi-continuous method, there is given, for example, a Girdler type deodorization apparatus including a deodorization tower equipped with several trays in the vertical direction, or the like. As an apparatus for the continuous method, there is given, for example, a thin-film deodorization apparatus filled with a structure, in which a film-like oil or fat can be brought into contact with water vapor.

Further, a refinement step that is generally used for an oil or fat may be used as a refinement step of the oil or fat composition of the present invention. More specifically, it includes a top cut distillation step, an acid treatment step, a decoloration step, a water washing step, and a thin-film evaporation treatment step or the like.

The top cut distillation step refers to the step of distilling an oil or fat composition, thereby removing light by-products such as fatty acids from it.

The acid treatment step refers to a step including adding a chelating agent such as citric acid to an oil or fat, followed by their mixing, and then subjecting the resulting mixture to oil-water separation or dehydration under reduced pressure to remove water, thereby removing impurities. An amount of the chelating agent to be used is preferably 0.001 to 5%, more preferably 0.01 to 1%, with respect to the oil or fat.

The decoloration step refers to a step including bringing an adsorbent or the like into contact with an oil or fat, thereby additionally improving its color and its taste and flavor. A porous adsorbent is preferably used as the adsorbent, and examples thereof include activated carbon, silicon dioxide, and a solid acid adsorbent. Examples of the solid acid adsorbent include acid clay, activated clay, activated alumina, silica gel, silica/alumina, and aluminum silicate or the like. The adsorbent may be used alone, or two or more of adsorbents may be used in combination. Of those, a solid acid adsorbent is preferred, and acid clay and activated clay are more preferred, from the viewpoint of reducing the content of by-products and the viewpoint of improving the taste and flavor and the color.

Acid clay and activated clay, both of which include $SiO_2$, $Al_2O_3$, $Fe_2O_3$, $CaO$, $MgO$ or the like as common chemical components, have an $SiO_2/Al_2O_3$ ratio of preferably 3 to 12, more preferably 4 to 10. Further, it is preferable to include, as its composition, 1 to 5% of $Fe_2O_3$, 0 to 1.5% of $CaO$, and 1 to 7% of $MgO$.

Activated clay is prepared by treating a naturally-occurring acid clay (montmorillonite-based clay) with a mineral acid such as sulfuric acid and is a compound that has a porous structure having a large specific surface area and a large adsorbing ability.

It is known that additional acid treatment of acid clay changes its specific surface area, thereby improving its decoloration ability and changing its physical properties. The specific surface area of acid clay or activated clay varies depending on, for example, the degree of acid treatment or the like, and is preferably 50 to 400 $m^2/g$. The pH (5% suspension) thereof is preferably 2.5 to 9, more preferably 3 to 7.

It is possible to use, as acid clay, for example, a commercially available product such as MIZUKA ACE #20 or MIZUKA ACE #400 (both manufactured by Mizusawa Industrial Chemicals, Ltd.). It is possible to use, as activated clay, for example, a commercially available product such as GALLEON EARTH V2R, GALLEON EARTH NV, or GALLEON EARTH GSF (all manufactured by Mizusawa Industrial Chemicals, Ltd.).

An amount of the adsorbent to be used is preferably less than 2%, more preferably 0.1% to less than 2%, more preferably 0.2 to 1.5%, even more preferably 0.3 to 1.3%, with respect to the oil or fat from the viewpoint of additionally improving the color and the taste and flavor and the viewpoint of improving the productivity.

The temperature at which the oil or fat is brought into contact with the adsorbent is preferably 20 to 150° C., more preferably 40 to 135° C., more preferably 60 to 120° C., even more preferably 105 to 120° C., from the viewpoints of reducing the content of by-products and improving the industrial productivity. Further, the time during which the oil or fat is brought into contact with the adsorbent is preferably 3 to 180 minutes, more preferably 5 to 120 minutes, more preferably 7 to 90 minutes, even more preferably 15 to 90 minutes, from the same viewpoints as described above. Reduced pressure or normal pressure may be applied as a pressure, and reduced pressure is preferred from the viewpoints of oxidation suppression and decoloration property.

The water washing step refers to a step including bringing water into contact with an oil or fat, thereby performing the operation of oil-water separation. Water washing can remove water-soluble impurities. The water washing step is preferably repeated a plurality of times (for example, three times).

The thin-film evaporation treatment step refers to a treatment in which a material for distillation is formed into a thin film, followed by heating, thereby evaporating a light fraction from an oil or fat, thus yielding the treated oil or fat as a residual fraction. The treatment is carried out by using a thin-film evaporator. The thin-film evaporator includes a centrifugal thin-film distillation apparatus, a falling film distillation apparatus, and a wiped film evaporator (wiped film distillation) or the like, which are different depending on methods of forming a thin film.

An antioxidant may be further added to the oil or fat composition according to the present invention as is the case with common edible oil or fat, from the viewpoints of improving its storage stability and the stability of its taste and flavor. The antioxidant includes natural antioxidants, tocopherol, ascorbyl palmitate, ascorbyl stearate, BHT, BHA, and phospholipids or the like.

Further, an emulsifier or the like may be added to the oil or fat composition according to the present invention from the viewpoints of, for example, improving the texture of cooked products or their taste and flavor and imparting a physiological effect. As an emulsifier or the like, there are given, for example, polyol esters of fatty acids such as polyglycerin condensed ricinolic acid ester, polyglycerin fatty acid esters, sucrose fatty acid esters, sorbitan fatty acid esters, polyoxyethylene sorbitan fatty acid esters or propylene glycol esters of fatty acids, organic acid monoglycerides, phytosterols, and phytosterol esters or the like.

The oil or fat composition according to the present invention may be used in exactly the same applications as a general edible oil or fat, and may be widely applied to various foods and drinks in which an oil or fat is used. The oil or fat composition according to the present invention may be used for, for example: oil-in-water type oil or fat processed foods such as drink, dessert, ice cream, dressing, toppings, mayonnaise and sauce for grilled meat; water-in-oil type oil or fat processed foods such as margarine and spread; processed oil or fat foods such as peanut butter, frying shortening, and baking shortening; processed foods such as potato chips, snacks, cake, cookies, pies, bread or chocolate; bakery mixes; processed meat products; frozen entrees; and frozen foods or the like.

EXAMPLES (Analysis Method)

(i) Measurement of MCPD-FS (In Accordance with Option A of Deutsche Gesellschaft für Fettwissenschaft (DGF) Standard Method C-III 18(09))

About 100 mg of an oil or fat sample were weighed in a test tube with a lid. 50 μL of an internal standard substance (3-MCPD-d5/t-butyl methyl ether), 500 μL of a t-butyl methyl ether/ethyl acetate-mixed solution (volume ratio 8:2), and 1 mL of 0.5 N sodium methoxide were added to the oil or fat sample, followed by stirring, and the resulting mixture was left to stand for 10 minutes. 3 mL of hexane and 3 mL of a 3.3% acetic acid/20% sodium chloride aqueous solution were added thereto, followed by stirring, and the upper layer of the resulting mixture was removed. 3 mL of hexane was further added, followed by stirring, and the upper layer of the resulting mixture was then removed. 250 μL of a mixed solution of 1 g of phenylboronic acid and 4 mL of 95% acetone were added, followed by stirring, and the test tube was hermetically sealed and heated at 80° C. for 20 minutes. 3 mL of hexane were added thereto, followed by stirring, and the upper layer of the resulting mixture was subjected to measurement with a gas chromatograph-mass spectrometer (GC-MS) to quantify MCPD-FS. Note that the case where the content of MCPD-FS was found to be 0.144 ppm or less was defined as being non-detectable (ND).

(ii) Glyceride Composition

About 10 mg of an oil or fat sample and 0.5 mL of a trimethylsilylating agent ("Silylating Agent TH" manufactured by Kanto Chemical Co., Inc.) were added into a glass sample bottle, followed by hermetical sealing, and the glass sample bottle was heated at 70° C. for 15 minutes. 1.0 mL of water and 1.5 mL of hexane were added to the mixture, followed by shaking. After leaving it to stand, and then the upper layer was subjected to gas-liquid chromatography (GLC) to perform analysis.

(iii) Constituent Fatty Acids Composition

Methyl esters of fatty acids were prepared in accordance with "Methods of preparing fatty acid methyl esters (2.4.1.-1996)" in "Standard methods for the Analysis of Fats, Oils and Related Materials" edited by Japan Oil Chemists' Society. The resulting samples were measured by the American Oil Chemists. Society Official Method Ce 1f-96 (GLC method).

(Evaluation to Taste and Flavor)

The evaluation to a taste and flavor was performed by a panel of five members. Each member ate 1 to 2 g of each sample and performed a sensory evaluation based on the criteria shown below. The average value of the scores was shown. Note that when both the average value of the initial taste of a sample and that of its aftertaste are more than 3, the sample is determined to be highly accepted by consumers.

| | (i) Initial taste |
|---|---|
| 4 | No bad oily smell |
| 3 | A slightly bad oily smell |
| 2 | A rather bad oily smell |
| 1 | A bad oily smell |
| | (ii) Aftertaste |
| 4 | A light and clean taste |
| 3 | A slightly heavy and slightly astringent taste |
| 2 | A rather heavy and rather astringent taste |
| 1 | A heavy and astringent taste |

(Preparation of Material Oil or Fat)

(1) 100 parts by mass of mixed fatty acids of soybean oil fatty acids:rapeseed oil fatty acids=7:3 (mass ratio) and 15 parts by mass of glycerin were mixed, and the resulting mixture was subjected to an esterification reaction with an enzyme, yielding a diacylglycerol-containing oil or fat. The resulting esterified mixture was subjected to distillation to remove fatty acids and monoacylglycerols, yielding a diacylglycerol-containing oil or fat (containing diacylglycerols at 90%). The diacylglycerol-containing oil or fat was subjected to acid treatment (a 10% citric acid aqueous solution was added at 2%) and water washing (three times with distilled water), yielding a "soybean/rapeseed DAG water-washed oil."

Similarly, a diacylglycerol-containing oil or fat (containing diacylglycerols at 82%) was produced from 100 parts by mass of palm oil fatty acids and 15 parts by mass of glycerin. The diacylglycerol-containing oil or fat was subjected to acid treatment (a 10% citric acid aqueous solution was added at 2%) and water washing (three times with distilled water), yielding a "palm DAG water-washed oil."

(2) Water vapor was brought into contact with the soybean/rapeseed DAG water-washed oil for 30 minutes under the condition of a pressure of 400 Pa, a treatment temperature of 240° C., and a mass ratio of water vapor/water-washed oil=0.03, yielding a deodorized oil. In addition, water vapor was brought into contact with the deodorized oil for 30 minutes under the condition of a pressure of 400 Pa, a treatment temperature of 180° C., and a mass ratio of water vapor/deodorized oil=0.03, yielding a diacylglycerol-rich oil or fat A. Table 1 shows its analysis values.

(3) A wiped film evaporator was used as a thin-film evaporator to perform distillation of the soybean/rapeseed DAG water-washed oil at a pressure of 4 Pa at a distillation temperature of 240° C., while supplying the oil or fat sample at a rate of 3 g per minute, yielding a treated oil. Next, water vapor was brought into contact with the treated oil for 30 minutes under the condition of a pressure of 400 Pa, a treatment temperature of 180° C., and a mass ratio of water vapor/treated oil=0.03, yielding a diacylglycerol-rich oil or fat B. Table 1 shows its analysis values.

(4) Water vapor was brought into contact with the palm DAG water-washed oil for 30 minutes under the condition of a pressure of 400 Pa, a treatment temperature of 240° C., and a mass ratio of water vapor/water-washed oil=0.03, yielding a deodorized oil. In addition, water vapor was brought into contact with the deodorized oil for 30 minutes under the condition of a pressure of 400 Pa, a treatment temperature of 180° C., and a mass ratio of water vapor/deodorized oil=0.03, yielding a diacylglycerol-rich oil or fat C. Table 1 shows its analysis values.

(5) A wiped film evaporator was used as a thin-film evaporator to perform distillation of the palm DAG water-washed oil at a pressure of 4 Pa at a distillation temperature of 240° C., while supplying the oil or fat sample at a rate of 3 g per minute, yielding a treated oil. Next, water vapor was brought into contact with the treated oil for 30 minutes under the condition of a pressure of 400 Pa, a treatment temperature of 180° C., and a ratio of water vapor/material=3%, yielding a diacylglycerol-rich oil or fat D. Table 1 shows its analysis values.

(6) Activated clay was brought into contact with the soybean/rapeseed DAG water-washed oil for 20 minutes under the condition of 9.3 kPa, a treatment temperature of 105° C., and a mass ratio of activated clay (GALLEON EARTH V2R, Mizusawa Industrial Chemicals, Ltd.)/water-washed oil=0.005, yielding a decolorized oil. In addition, water vapor was brought into contact with the decolorized oil for 30 minutes under the condition of a pressure of 400 Pa, a treatment temperature of 180° C., and a mass ratio of water vapor/decolorized oil=0.03, yielding a diacylglycerol-rich oil or fat E. Table 1 shows its analysis values.

(7) Water vapor was brought into contact with the soybean/rapeseed DAG water-washed oil for 30 minutes under the condition of a pressure of 400 Pa, a treatment temperature of 240° C., and a mass ratio of water vapor/water-washed oil=0.03, yielding a diacylglycerol-rich oil or fat F. Table 1 shows its analysis values.

(8) There were used, as oil or fat G and H, oil or fat each having the composition shown in Table 1 (oil or fat G: Nisshin Refined Rapeseed Oil (The Nisshin OilliO Group, Ltd.), oil or fat H: RBD Palm Oil (KECK SENG (MALAYSIA) BERHAD)).

Examples 1 and 2 and Comparative Examples 1 and 2

The diacylglycerol-rich oil or fat A and B were mixed at each ratio shown in Table 2, yielding each oil or fat composition. Table 2 shows the analysis values of each oil or fat composition and the evaluations to the taste and flavor thereof.

TABLE 2

| | | Example 1 | Example 2 | Comparative Example 1 | Comparative Example 2 |
|---|---|---|---|---|---|
| Material oil or fat | Oil or fat A [mass %] | 20 | 0 | 30 | 40 |
| | Oil or fat B [mass %] | 80 | 100 | 70 | 60 |
| Analysis values | DAG [mass %] | 89 | 89 | 89 | 89 |
| | MCPD-FS [ppm] | 12 | 1 | 19 | 25 |
| Evaluations to taste and flavor | Initial taste | 4 | 4 | 4 | 4 |
| | Aftertaste | 4 | 4 | 3 | 2 |

Example 3 and Comparative Example 3

The diacylglycerol-rich oil or fat A and B and the oil or fat G were mixed at each ratio shown in Table 3, yielding each oil or fat composition. Table 3 shows the analysis values of each oil or fat composition and the evaluations to the taste and flavor thereof.

TABLE 1

| | Oil or fat A | Oil or fat B | Oil or fat C | Oil or fat D | Oil or fat E | Oil or fat F | Oil or fat G | Oil or fat H |
|---|---|---|---|---|---|---|---|---|
| Glyceride composition [mass %] | | | | | | | | |
| MAG | 0.1 | 0.0 | 0.4 | 0.0 | 0.5 | 0.3 | 0.0 | 0.0 |
| DAG | 88.5 | 88.5 | 81.2 | 80.0 | 86.2 | 86.7 | 0.9 | 4.5 |
| TAG | 11.3 | 11.5 | 18.4 | 20.0 | 13.1 | 12.9 | 99.1 | 95.5 |
| Fatty acids | 0.1 | 0.0 | 0.0 | 0.0 | 0.2 | 0.1 | 0.0 | 0.0 |
| Fatty acids composition [mass %] | | | | | | | | |
| C14:0 | 0.1 | 0.1 | 1.0 | 0.8 | 0.1 | 0.1 | 0.0 | 1.1 |
| C16:0 | 2.6 | 2.6 | 43.3 | 41.2 | 2.6 | 2.7 | 4.3 | 43.7 |
| C16:1 | 0.1 | 0.1 | 0.2 | 0.2 | 0.1 | 0.1 | 0.2 | 0.2 |
| C18:0 | 1.0 | 1.0 | 4.4 | 4.6 | 0.9 | 1.0 | 2.0 | 4.4 |
| C18:1 | 37.3 | 37.3 | 40.4 | 41.6 | 37.7 | 37.9 | 60.5 | 39.7 |
| C18:2 | 49.2 | 49.2 | 10.4 | 10.8 | 49.0 | 49.0 | 21.0 | 10.3 |
| C18:3 | 9.2 | 9.2 | 0.2 | 0.3 | 9.1 | 8.4 | 10.8 | 0.2 |
| C20:0 | 0.2 | 0.2 | 0.0 | 0.4 | 0.2 | 0.2 | 0.6 | 0.4 |
| C20:1 | 0.0 | 0.0 | 0.0 | 0.0 | 0.0 | 0.4 | 0.4 | 0.0 |
| C22:0 | 0.2 | 0.2 | 0.0 | 0.0 | 0.2 | 0.2 | 0.0 | 0.0 |
| C24:0 | 0.1 | 0.1 | 0.1 | 0.1 | 0.1 | 0.1 | 0.1 | 0.1 |

TABLE 3

|  |  | Example 3 | Comparative Example 3 |
|---|---|---|---|
| Material oil or fat | Oil or fat A [mass %] | 20 | 40 |
|  | Oil or fat B [mass %] | 30 | 0 |
|  | Oil or fat G [mass %] | 50 | 60 |
| Analysis values | DAG [mass %] | 45 | 36 |
|  | MCPD-FS [ppm] | 12 | 24 |
| Evaluations to taste and flavor | Initial taste | 4 | 4 |
|  | Aftertaste | 4 | 2 |

Examples 4 to 6 and Comparative Examples 4 and 5

The diacylglycerol-rich oil or fat B and the oil or fat G were mixed at each ratio shown in Table 4, yielding each oil or fat composition. Table 4 shows the analysis values of each oil or fat composition and the evaluations to the taste and flavor thereof.

TABLE 4

|  |  | Example 4 | Example 5 | Example 6 | Comparative Example 4 | Comparative Example 5 |
|---|---|---|---|---|---|---|
| Material oil or fat | Oil or fat B [mass %] | 50 | 30 | 25 | 13 | 0 |
|  | Oil or fat G [mass %] | 50 | 70 | 75 | 87 | 100 |
| Analysis values | DAG [mass %] | 45 | 27 | 23 | 12 | 1 |
|  | MCPD-FS [ppm] | 1 | 0.3 | 0.3 | ND | ND |
| Evaluations to taste and flavor | Initial taste | 4 | 4 | 3.5 | 3 | 3 |
|  | Aftertaste | 4 | 4 | 4 | 3 | 2 |

Examples 7 and 8 and Comparative Examples 6 and 7

The diacylglycerol-rich oil or fat C and D were mixed at each ratio shown in Table 5, yielding each oil or fat composition. Table 5 shows the analysis values of each oil or fat composition and the evaluations to the taste and flavor thereof.

TABLE 5

|  |  | Example 7 | Example 8 | Comparative Example 6 | Comparative Example 7 |
|---|---|---|---|---|---|
| Material oil or fat | Oil or fat C [mass %] | 10 | 0 | 15 | 22 |
|  | Oil or fat D [mass %] | 90 | 100 | 85 | 78 |
| Analysis values | DAG [mass %] | 80 | 80 | 80 | 80 |
|  | MCPD-FS [ppm] | 12 | 1 | 18 | 26 |
| Evaluations to taste and flavor | Initial taste | 4 | 4 | 4 | 4 |
|  | Aftertaste | 4 | 4 | 3 | 2 |

Examples 9 to 11 and Comparative Examples 8 and 9

The diacylglycerol-rich oil or fat D and the oil or fat H were mixed at each ratio shown in Table 6, yielding each oil or fat composition. Table 6 shows the analysis values of each oil or fat composition and the evaluations to the taste and flavor thereof.

TABLE 6

|  |  | Example 9 | Example 10 | Example 11 | Comparative Example 8 | Comparative Example 9 |
|---|---|---|---|---|---|---|
| Material oil or fat | Oil or fat D [mass %] | 50 | 30 | 22 | 8 | 0 |
|  | Oil or fat H [mass %] | 50 | 70 | 78 | 92 | 100 |
| Analysis values | DAG [mass %] | 43 | 28 | 23 | 12 | 7 |
|  | MCPD-FS [ppm] | 5 | 6 | 6 | 7 | 8 |
| Evaluations to taste and flavor | Initial taste | 4 | 4 | 3.5 | 3 | 3 |
|  | Aftertaste | 4 | 4 | 4 | 3 | 2 |

Examples 12 and 13

The diacylglycerol-rich oil or fat E and the oil or fat G were mixed at each ratio shown in Table 7, yielding each oil or fat composition. Table 7 shows the analysis values of each oil or fat composition and the evaluations to the taste and flavor thereof.

TABLE 7

|  |  | Example 12 | Example 13 |
|---|---|---|---|
| Material oil or fat | Oil or fat E [mass %] | 100 | 30 |
|  | Oil or fat G [mass %] | 0 | 70 |
| Analysis values | DAG [mass %] | 86 | 26 |
|  | MCPD-FS [ppm] | 1 | 0.4 |
| Evaluations to taste and flavor | Initial taste | 4 | 4 |
|  | Aftertaste | 4 | 4 |

As shown in Table 2 to Table 7, each oil or fat composition produced by applying deodorization treatment thereto, which had an MCPD-FS content (ppm) of 13 ppm or less, the content being measured by the DGF standard method C-III 18(09), and had a diacylglycerol content of 15% or more, was found to be an oil or fat composition having an absolutely excellent taste and flavor, that is, having both an initial taste free of a bad oily smell and a light and clean aftertaste.

On the other hand, each oil or fat composition having an MCPD-FS content (ppm) of more than 13 ppm had a heavy and astringent aftertaste (Comparative Examples 1, 2, 3, 6, and 7). Each oil or fat composition having a diacylglycerol content of less than 15% had an initial taste with a bad oily smell, and as the diacylglycerol content becomes smaller, not only the initial taste but also the heaviness of the aftertaste was found to be affected more adversely (Comparative Examples 4, 5, 8, and 9).

Example 14 and Comparative Example 10

(Production of Mayonnaise)

The oil or fat composition E or F shown in Table 1 was used as an oil phase, and an aqueous phase was prepared in accordance with a usual method so as to have the blending amount shown in Table 8. Next, each oil or fat composition was added at 67 parts by mass with respect to 33 parts by mass of the aqueous phase while the aqueous phase was being stirred, thereby performing preliminary emulsification. After that, a colloid mill (3,000 rpm, clearance: 0.08 mm) was used to perform homogenization, thus producing mayonnaise having an average particle diameter of 2.0 to 3.5 μm. The resulting mayonnaise was filled in a tube-type, plastic 100-g container and used as a sample. Table 9 shows the analysis values of each oil or fat composition.

TABLE 8

|  | Blending amount (part(s) by mass) |
|---|---|
| Salt | 0.2 |
| White superior soft sugar | 1.0 |
| Seasoning | 0.4 |
| Mustard powder | 0.2 |
| Thickener* | 0.5 |
| Enzyme-treated yolk** | 11.0 |
| Normal yolk | 7.0 |
| Brewed vinegar | 6.0 |
| Water | 6.7 |
| Oil phase | 67.0 |

*San-Ei Gen F.F.I, Inc., SM700
**Lyso ratio of 90%

Note that the enzyme-treated yolk used as the raw material was prepared in the following manner.

750 g of a yolk liquid with a salt concentration of 10%, 150 g of water, and 15 g of salt were mixed, yielding a diluted salted yolk. Next, after the diluted salted yolk was preliminarily heated sufficiently at a reaction temperature, phospholipase A2 with an enzyme activity of 10,000 IU/mL was added at 0.02% with respect to the amount of the diluted salted yolk, followed by a reaction at 50° C. for 20 hours, yielding an enzyme-treated yolk.

The lyso ratio may be determined by the measurement method described below, and the above-mentioned enzyme-treated yolk had a lyso ratio of 90%.

Thus, the above-mentioned enzyme-treated yolk was used as the enzyme-treated yolk, and the above-mentioned diluted salted yolk was used as an enzyme-untreated yolk.

(Measurement Method of Lyso Ratio)

About 1 g of a yolk was weighed, and 1.0 mL of water was added to the yolk, followed by sufficient stirring and dispersion of the yolk. After that, 9.0 mL of 2-propanol were added, followed by stirring and then extraction. The mixture was left to stand for several minutes, resulting in the sedimentation of a cloudy substance. The supernatant was filtered with a 0.45-μm membrane filter, and the filtrate was subjected to an HPLC analysis.

Example of conditions for HPLC analysis Analyzer: LC-VP Series (SHIMADZU); Detector: ELSD2000 (Alltech), impactor off, gas flow rate: 2.4 L/min., tube temperature: 82° C.; Column: Atlantis HILIC Silica 5 μm×4.6×250 mm (Waters); Eluent: acetonitrile:methanol:water=7:1:2 (0.1% acetic acid); Flow rate: 1.0 mL/min.; Injection volume: 30 μL; Column temperature: 40° C.; Analysis time: 15 minutes The lyso ratio was quantified with an external calibration curve through the use of authentic samples (PC (Epikuron 200, Lucus Meyer) and LPC (Egg-yolk Lecithin LC-100, Kewpie Corporation)) to calculate the lyso ratio with the following equation.

Lyso ratio (%)=$LPC(PC+LPC) \times 100$ (Evaluation to Taste and Flavor)

Each sample was left to stand at 40° C. for 1 week or at 20° C. for 1 month, yielding aged products, respectively. The taste and flavor of the aged products was evaluated by a panel of six members in accordance with the evaluation criteria described below. The average value of the scores was shown. Table 9 shows the results.

4: Having a mild sourness and a good taste and flavor
3: Having a good taste and flavor but having a strong sourness
2: Having a slightly unusual taste and a slightly unusual smell
1: Having a bad taste and flavor

TABLE 9

|  |  | Example 14 | Comparative Example 10 |
|---|---|---|---|
| Material oil or fat | Oil or fat E [mass %] | 100 | 0 |
|  | Oil or fat F [mass %] | 0 | 100 |
| Analysis values | DAG [mass %] | 86 | 87 |
|  | MCPD-FS [ppm] | 1 | 90 |
| Evaluations to taste and flavor of mayonnaise | At 40° C. for 1 week | 4 | 3 |
|  | At 20° C. for 1 month | 4 | 3 |

As shown in Table 9, the mayonnaise produced by using the oil or fat composition having an MCPD-FS content (ppm) of 13 ppm or less and having a diacylglycerol content of 15% or more had a mild sourness and a good taste and flavor.

The invention claimed is:

1. An oil or fat composition, which has a content of 3-chloropropane-1,2-diol forming substances (MCPD-FS) of 7 ppm or less, the content being measured by a Deutsche Gesellschaft für Fettwissenschaft (DGF) standard method C-III 18(09), has a diacylglycerol content of 15 mass % or more, and is subjected to deodorization treatment at a treatment temperature of from 120 to 205° C. and a treatment time of from 5 to 110 minutes,
wherein the oil or fat comprises from 0.1 to 2 mass % of monoacylglycerol.

2. The oil or fat composition according to claim 1, wherein the diacylglycerol content is 20 mass % or more.

3. The oil or fat composition as defined in claim 1, wherein the diacylglycerol content is 30 mass % or more.

4. The oil or fat composition as defined in claim 3, wherein the diacylglycerol content is 50 mass % or more.

5. The oil or fat composition as defined in claim 1, wherein the MCPD-FS content (ppm), measured by a Deutsche Gesellschaft für Fettwissenschaft (DGF) standard method C-III 18(09), is 3 ppm or less.

6. The oil or fat composition as defined in claim 5, wherein the MCPD-FS content (ppm), measured by a Deutsche Gesellschaft für Fettwissenschaft (DGF) standard method C-III 18(09), is 1 ppm or less.

7. The oil or fat composition as defined in claim 1, wherein a content of elaidic acid present in a constituent fatty acid of an oil or fat in the oil or fat composition is 1 mass % or less.

8. The oil or fat composition as defined in claim 1, wherein in a constituent fatty acid of an oil or fat in the oil or fat composition, a ratio of a fatty acid having two double bonds, including a trans double bond, and having 18 carbon atoms to a fatty acid having two double bonds and having 18 carbon atoms is 4 mass % or less.

9. The oil or fat composition as defined in claim 8, wherein in a constituent fatty acid of an oil or fat in the oil or fat composition, a ratio of a fatty acid having two double bonds, including a trans double bond, and having 18 carbon atoms to a fatty acid having two double bonds and having 18 carbon atoms is 2.5 mass % or less.

10. The oil or fat composition as defined in claim 1, wherein the oil or fat comprises triacylglycerol in an amount of from 4.9 to 84.9 mass %.

11. The oil or fat composition as defined in claim 1, wherein the oil or fat comprises 5 mass % or less of a free fatty acid or a salt thereof.

12. The oil or fat composition as defined in claim 11, wherein the oil or fat comprises from 0 to 1 mass % of a free fatty acid or a salt thereof.

13. The oil or fat composition as defined in claim 1, wherein the deodorization treatment comprises a steam distillation under reduced pressure.

14. The oil or fat composition as defined in claim 13, wherein an amount of water vapor in the deodorization treatment is from 0.1 to 20 mass % with respect to an amount of the oil or fat.

15. The oil or fat composition as defined in claim 13, wherein a pressure in the deodorization treatment is from 0.01 to 4 kPa.

16. The oil or fat composition as defined in claim 1, which is subjected to a decoloration as a refinement of the oil or fat composition.

17. The oil or fat composition as defined in claim 16, wherein the decoloration comprises contacting at least one porous adsorbent selected from the group consisting of activated carbon, silicon dioxide and a solid acid adsorbent with the oil or fat composition.

18. The oil or fat composition as defined in claim 17, wherein the solid acid adsorbent is at least one adsorbent selected from the group consisting of acid clay, activated clay, activated alumina, silica gel, silica/alumina and aluminum silicate.

19. The oil or fat composition as defined in claim 1, wherein the deodorization treatment is applied in the final step of refining treatment.

20. An oil or fat composition, which has a content of 3-chloropropane-1,2-diol forming substances (MCPD-FS) of 7 ppm or less, wherein the content is measured by a Deutsche Gesellschaft für Fettwissenschaft (DGF) standard method C-III 18(09), has a diacylglycerol content of 15 mass % or more, and is subjected to deodorization treatment at a treatment temperature of from 120 to 205° C. and a treatment time of from 5 to 110 minutes,
wherein the oil or fat comprises from 4.9 to 84.9 mass % of triacylglycerol.

21. The oil or fat composition as defined in claim 20, wherein the oil or fat comprises from 6.9 to 29.9 mass of triacylglycerol.

* * * * *